United States Patent [19]
Mattis

[11] Patent Number: 5,460,229
[45] Date of Patent: Oct. 24, 1995

[54] FIELD AERATOR APPARATUS

[76] Inventor: Henry J. Mattis, 601 Shoshone #15, Cheyenne, Wyo. 82009

[21] Appl. No.: 217,972

[22] Filed: Mar. 25, 1994

[51] Int. Cl.[6] ............................................. A01B 45/02
[52] U.S. Cl. .......................... 172/21; 172/776; 172/540; 172/118
[58] Field of Search ............... 172/21, 22, 213, 172/776, 677, 118, 91, 540; 56/226, 249; 111/89

[56]  References Cited

U.S. PATENT DOCUMENTS

| | | |
|---|---|---|
| 767,890 | 8/1904 | Hoyle . |
| 1,696,654 | 12/1928 | Stem . |
| 2,229,497 | 1/1941 | Dontje ........................................ 172/21 |
| 2,314,035 | 3/1943 | Dontje ........................................ 172/21 |
| 2,476,084 | 7/1949 | Cour ...................................... 172/21 X |
| 2,509,463 | 5/1950 | Wade . |
| 2,741,968 | 4/1956 | Harris ................................... 172/21 X |
| 2,778,291 | 1/1957 | Kerns . |
| 2,857,835 | 10/1958 | Fitzgerald . |
| 3,084,747 | 4/1963 | Ferris . |
| 3,171,498 | 3/1965 | Logan ........................................ 172/22 |
| 3,199,278 | 8/1965 | Dye ....................................... 172/21 X |
| 3,528,508 | 9/1970 | Stevenson . |
| 3,716,005 | 2/1973 | Fennell ................................... 172/21 X |
| 3,794,121 | 2/1974 | Drozak ...................................... 172/21 |
| 3,800,884 | 4/1974 | Estes ..................................... 172/776 X |
| 3,993,143 | 11/1976 | Moreland, Jr. ............................. 172/22 |
| 4,192,387 | 3/1980 | Stinson ...................................... 172/21 |
| 4,489,789 | 12/1984 | Pearce ..................................... 172/677 |
| 4,523,771 | 6/1985 | Bender ................................. 172/677 X |
| 4,619,329 | 10/1986 | Gorbett ..................................... 172/21 |
| 4,821,811 | 4/1989 | Swenson . |
| 4,840,232 | 6/1989 | Mayer ....................................... 172/21 |
| 5,343,958 | 9/1994 | Kromminga et al. ............... 172/677 X |
| 5,353,724 | 10/1994 | Wheeley, Jr. ........................... 172/21 X |

Primary Examiner—David H. Corbin
Assistant Examiner—Victor Batson
Attorney, Agent, or Firm—Dean P. Edmundson

[57]  ABSTRACT

Apparatus useful for aerating soil, especially grass or hay ground. The apparatus is intended to be towed by a farm tractor, and the apparatus includes elongated spikes on a cylindrical drum. As the apparatus is towed across a field, the spikes penetrate the soil and loosen it as well as providing openings in the soil to improve absorption of water. This reduces water run-off. The spikes are secured to bands encircling the drum, and the spacing between bands is adjustable so that the spacing between spikes can be adjusted.

14 Claims, 4 Drawing Sheets

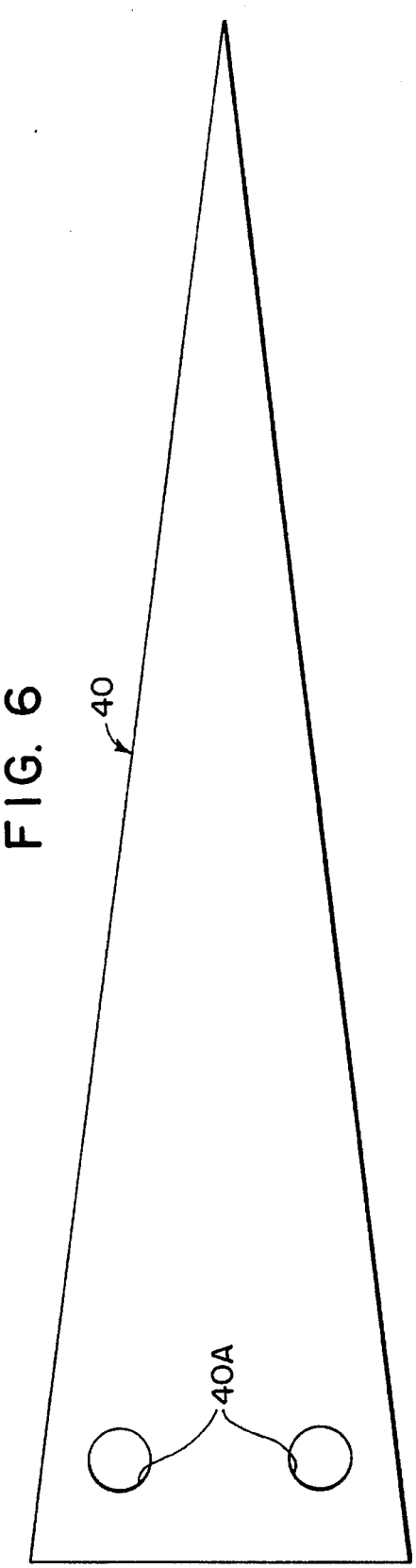

FIELD AERATOR APPARATUS

FIELD OF THE INVENTION

This invention relates to apparatus and techniques for aerating soil. More particularly, this invention relates to techniques for aerating soil using apparatus including spikes on a cylindrical drum.

BACKGROUND OF THE INVENTION

Soil can become compacted or sod-bound with the passage of time and consequently does not absorb moisture as well as desired. Also, compacted soil does not enable air to penetrate into the soil.

Various types of apparatus have been previously proposed for use in aerating soil. However, such apparatus has exhibited various disadvantages and drawbacks which have limited the effectiveness of such apparatus.

For example, U.S. Pat. No. 2,778,291 describes a rotary renovator which includes a drum having teeth mounted on its periphery. A box for distributing fertilizer is carried on the frame behind the drum, and a chain driven by a gear on each end of the drum causes fertilizer to be distributed as the apparatus is towed. The teeth are mounted to the periphery of the drum in fixed locations. Consequently, the spacing between adjacent rows of teeth is fixed and cannot be changed. For use in certain types of soil, this is a significant disadvantage.

U.S. Pat. No. 767,890 describes a rotary harrow in which rows of diamond-pointed teeth or shovels are mounted on the surface of a drum. The apparatus is said to be useful for breaking up clods in a plowed field. The type of teeth or shovels as shown in the patent would not be suitable for aerating compacted soils, however.

U.S. Pat. No. 2,509,463 describes a land clearing machine for removing small stumps and roots from beneath the top soil. Curved teeth on a drum penetrate into the ground to engage stumps or roots and pull them out of the ground. Stripper teeth are positioned near the rear of the apparatus for removing roots or other items pulled from the ground by the teeth on the drum. This device would not be satisfactory for aerating ground because it would tend to disrupt or damage roots of growing grass, for example.

U.S. Pat. No. 3,084,747 also describes apparatus for clearing roots, etc. from the ground. The apparatus includes a driven drum canted obliquely from the forward direction of travel of the drum, and the drum is driven in a direction opposite to forward direction of travel. Curved blades on the drum are driven into the ground to engage roots, etc. and drag them to the surface. Such apparatus would not be suitable for aerating soil because it would be too disruptive of growing grass and plants.

U.S. Pat. No. 1,696,654 describes a roller cultivator for use in orchards. The apparatus includes one or more heavy rollers with spade-like or chisel teeth or blades which cut through ground cover and dig up the soil as the device is towed between rows of trees. The apparatus is intended to dig up the ground and not merely puncture it. Accordingly, such apparatus is not suitable for aerating.

U.S. Pat. No. 2,857,835 describes apparatus for fracturing soil. Teeth are mounted on the surface of a drum. The teeth holders include a V-shaped web having triangular wings and a slotted tip. Points are frictionally held to the tips of the holders. No lateral adjustment or movement of teeth or teeth holders is possible.

U.S. Pat. No. 3,528,508 describes sod disturbing and replanting apparatus. The apparatus includes teeth on a drum for extending into the ground. A box on the rear of the apparatus distributes grass seed or the like. There is no provision for adjusting the lateral spacing between teeth on the drum.

U.S. Pat. No. 4,821,811 describes a towable support frame for a pair of 12-row implements in side-by-side relation. There is no description of field aerating apparatus.

There has not heretofore been described aerating apparatus which enables lateral adjustment of teeth on a rotating drum.

SUMMARY OF THE PRESENT INVENTION

In accordance with the present invention there is provided improved apparatus for aerating soil in a field. The apparatus is intended to be towed across the field with a vehicle such as a conventional farm tractor.

In a preferred embodiment the apparatus includes a frame, at least one cylindrical drum rotatably carried by the frame for rotation about its longitudinal axis, attachment means on the frame for connecting the apparatus to a towing vehicle, a plurality of laterally adjustable band members on the periphery of the drum, and a plurality of spike members secured to the bands and projecting radially outward from the drum. Wheels may be rotatably carried on each corner of the frame. The spike members may be arc-shaped, if desired.

The drum has a diameter generally in the range of about 2 to 4 feet, and the spikes have a thickness in range of about 0.5 to 1 inch. It has been found that if the drum has a diameter smaller than about 2 feet it must rotate too fast as it is towed across a field. This can result in increased wear and in the apparatus bouncing over certain areas of the ground. If the diameter is larger than about 4 feet, the apparatus can become too wide for transport on conventional roads (when the apparatus is towed from one end).

The bands are laterally adjustable (axially with respect to the drum) so that the lateral spacing between adjacent spikes can be adjusted as described. This enables the spikes to be positioned exactly where they are needed on the drum. For some types of field conditions, it may be desirable for the spikes to be positioned very close together, while for other soil conditions it may be necessary to increase the spacing between spikes.

The thickness of the spikes is extremely important. If the spikes are narrower than about 0.5 inch they could bend or break when hitting obstacles such as rocks in the soil. If the spikes are thicker than about one inch, they do not easily penetrate the soil to cause aeration. Consequently, the thickness is very important.

Also, the spikes are preferably arc-shaped so that they will easily penetrate the soil. It is very desirable for the spikes to penetrate the soil without tearing out grass and roots of growing plants. In some types of soil it may be desirable to use spikes which are not arc-shaped, e.g., where there is grass with very short roots.

The apparatus described herein is especially useful for aerating hay or grass fields, including alfalfa fields, grass meadows, and virgin sod or prairie grounds. Aerating these types of ground results in significant reduction of soil erosion, reduction of amount of water required for irrigation, and less water run-off. It also results in increased hay and grass production. The aerated soil absorbs much more water than non-aerated soil.

The apparatus can be provided with one or more rotatable drums, as desired. Accordingly, the device can be made in any operating width desired. It is also possible to tow several of the implements behind a tractor in side-by-side fashion. A tongue can be attached to either the front or rear of the apparatus for towing. Also, a tongue could be attached to one end of the embodiment which includes wheels for transporting the apparatus on roads. As another alternative, a three-point hitch attachment could be used for attaching the apparatus to a conventional three-point hitch on a tractor.

Other features and advantages of the apparatus of the invention will be apparent from the following detailed description and the accompanying drawings.

BRIEF DESCRIPTION OF THE DRAWINGS

The invention is described in more detail hereinafter with reference to the accompanying drawings, wherein like reference characters refer to the same parts throughout the several views and in which:

FIG. 5 is a side elevational view of a preferred embodiment of spike member useful in the apparatus of this invention; and FIG. 6 is a side elevational view of another embodiment of spike member.

DETAILED DESCRIPTION OF THE INVENTION

Figure 1:
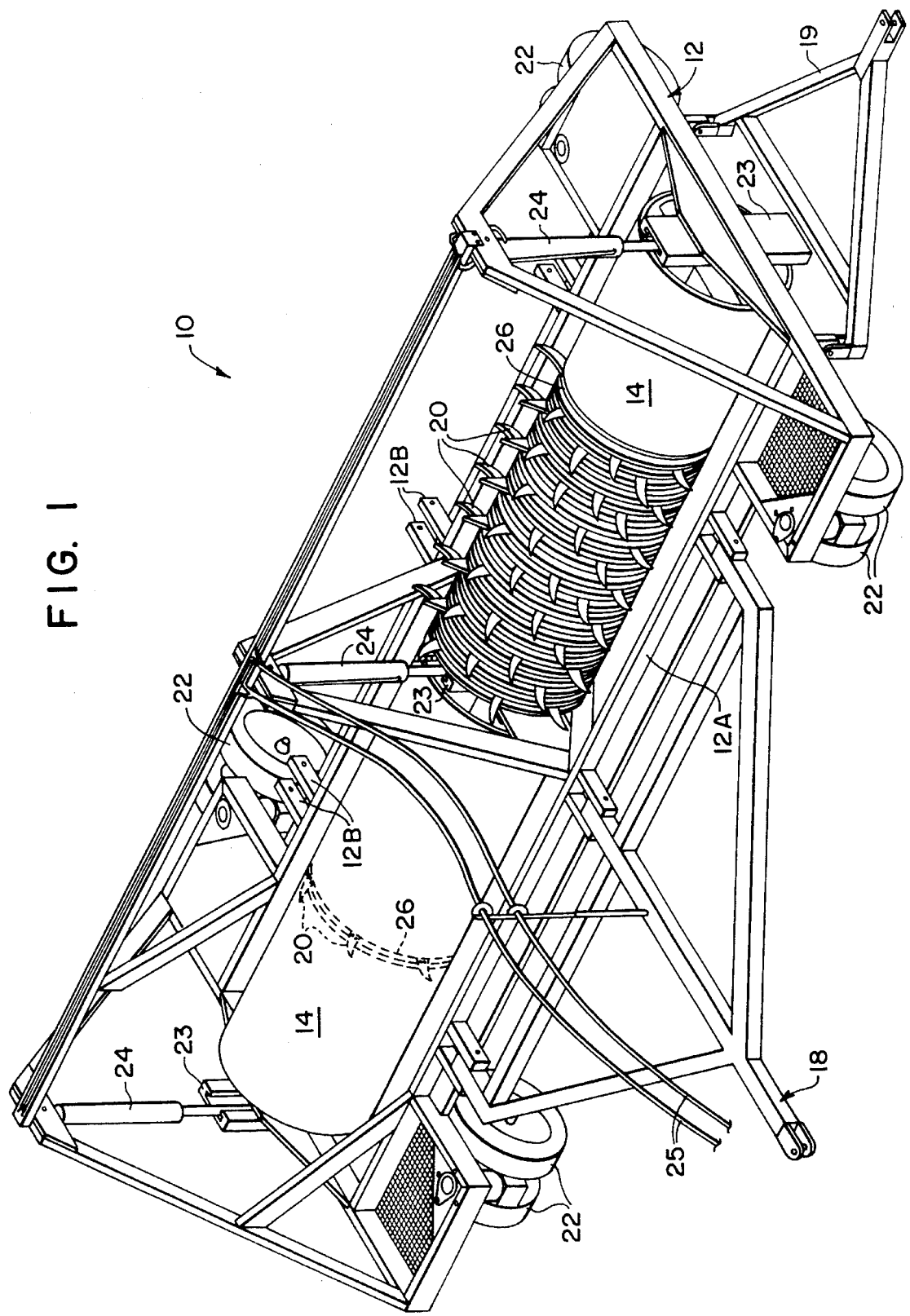
FIG. 1 is a perspective view of one embodiment of aerator apparatus of the invention.

In FIG. 1 there is shown a front perspective view of one embodiment of aerator apparatus 10 of the invention comprising a generally rectangular frame 12 and one or more cylindrical drums 14 rotatably carried by the frame. Attached to the periphery of each drum are a plurality of spike members 20 for perforating the soil as the apparatus is towed across a field. A tongue 18 is shown attached to the forward side 12A of the frame 12 for towing the apparatus with a conventional tractor, for example. Attachment points 12B on the rearward side of the apparatus are useful for attaching tongue 18 for towing in the opposite direction, if desired. For example, where the soil is very soft or where there are fragile plants in the soil.

Preferably there is another tongue member 19 attached to one end of the frame for towing the apparatus on the road, for example, for transport from one field to another. This arrangement enables a very wide implement to be transported on normal roads.

In the embodiment shown in FIG. 1 there are wheels 22 positioned at each corner of the frame and are attached by means of casters so that the wheels can turn in any desired direction. It also enables the use of double wheels at each corner without sacrificing maneuverability.

The cylindrical drums can be raised or lowered relative to the frame by means of hydraulic cylinders 24 which are connected to the hydraulic system of a towing tractor by means of hoses 25. All of the hydraulic cylinders operate in unison so that the drums are raised or lowered evenly.

When operating the apparatus in soil which is hard and difficult to penetrate, the drums may be lowered completely so that the wheels of the frame are lifted off the ground. This assures that the entire weight of the apparatus is placed on the spikes to urge them into the soil. When operating the apparatus in soil which is looser, the drums may not be lowered completely. Rather, a portion of the weight of the apparatus is supported by the wheels. Thus, the depth of penetration of the spike members into the soil can be carefully controlled and adjusted.

The drums are typically made of heavy steel and are carried on an axle or shaft which extends therethrough. The outer ends of each axle or shaft are carried in holders which are connected to the lower ends of cylinders 24 and which are slidably retained in brackets 23. This arrangement enables the drums to be raised and lowered by the cylinders very efficiently and smoothly.

The spike members are secured at their base ends to band members 26 which are in turn attached to the periphery of drum 14. Preferably there are a plurality of spike members secured to each band member and spaced apart from each other. Although not shown in FIG. 1, the band members with attached spike members extend across the full length of each of the drum members.

Figure 2:
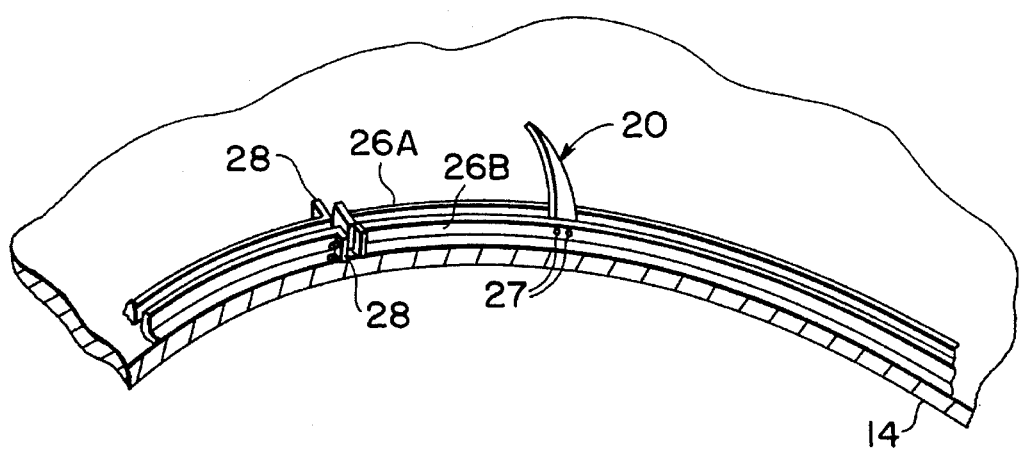
FIG. 2 is a perspective, partially cut-away view showing the manner in which the spike members are attached to the periphery of the drum.
Figure 3:
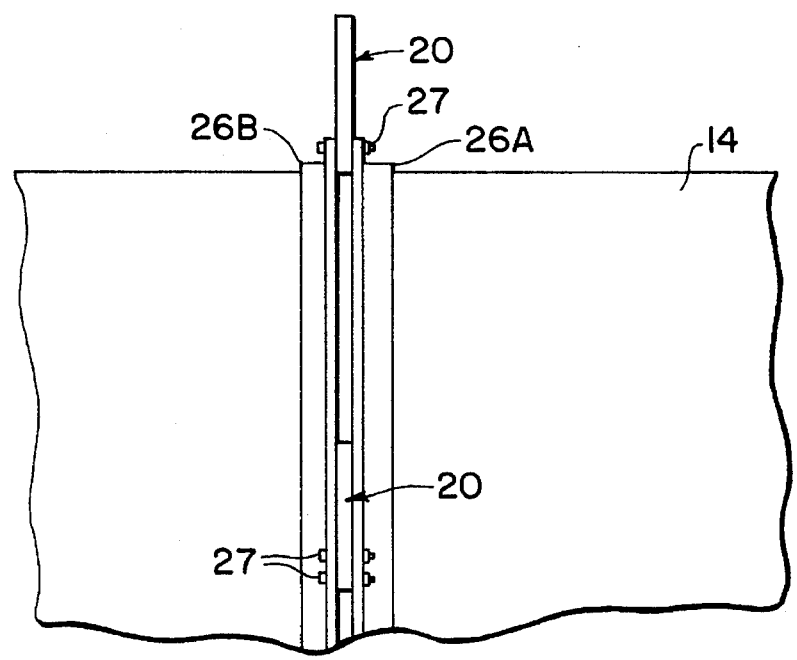
FIG. 3 is a rear elevational view of a portion of the cylindrical drum and band member shown in FIG. 2.

Preferably each spike member is bolted securely at its base to the band member, as illustrated in FIGS. 2 and 3. Two bolts 27 pass through holes in the base of each spike member to assure that the spike member is very securely held in place.

Each band member 26 comprises spaced-apart angle iron members 26A and 26B, as illustrated in FIGS. 2 and 3. Each spike member is secured between the spaced-apart members 26A and 26B and bolted in place so as to be very secure and very well supported. This imparts great strength and durability to the implement.

The band members are capable of being moved axially along the drum 14 so that spacing between adjacent rows of spike members can be easily varied, as desired. This may be easily accomplished because the ends of the band members are bolted together by bolts 28, as shown. By loosening bolts 28, the band members are loosened and can then be moved along the drum laterally. Then the bands can be tightened again in the new location. Depending upon the type of soil being perforated, it may be desirable to move the spike members closer together or further apart. Also, additional bands and spikes could be added to the drum, if desired.

Preferably each band member includes at least two arc-shaped segments or sections which are detachably connected at their ends, e.g., by bolting the ends together. Of course, other means for attaching the band segments or sections together could also be used.

The spike members which are useful in the apparatus of this invention preferably have a length of about 12 inches. If the spike members are too short (i.e., less than about 6 inches) they will normally not be able to sufficiently penetrate soil for effective aeration. If the spike members are too long (i.e., greater than about 12 inches, no increase in effectiveness is observed. The thickness of the spike member is in the range of about 0.5 to 1 inch, with 0.75 inch being preferred.

The diameter of the drum member is preferably about 3 feet, although it could be as small as about 2 feet or as great as about 4 feet.

Figure 4:
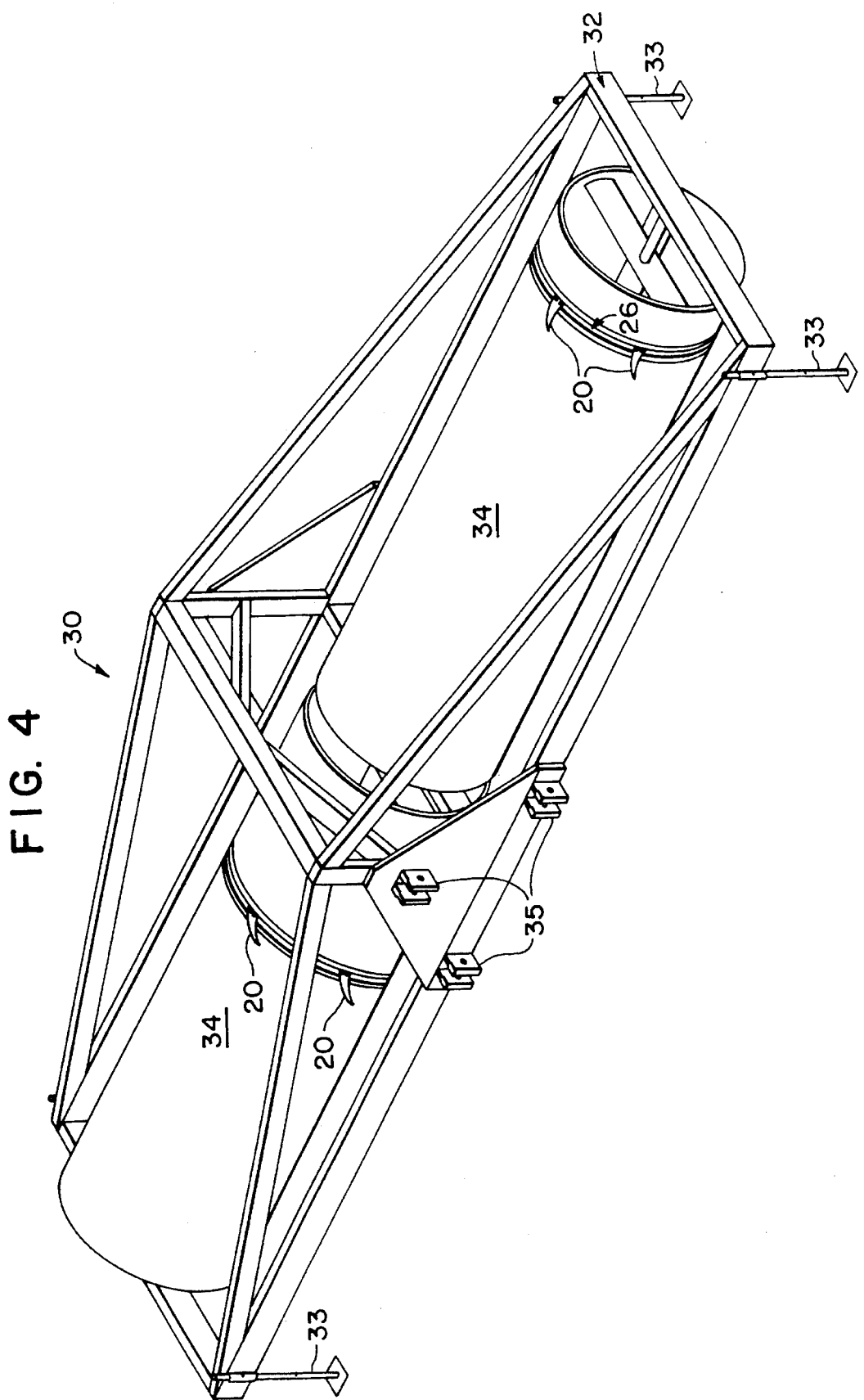
FIG. 4 is a perspective view of another embodiment of aerator apparatus of the invention.

FIG. 4 is a front perspective view of another embodiment of aerator apparatus 30 of the invention. This embodiment comprises a frame member 32 and one or more cylindrical drum members 34 rotatably carried by the frame. The forward portion of the frame includes attachment brackets 35 for attachment of the apparatus to an existing conventional three-point hitch on a tractor.

Around the periphery of each drum 34 are a plurality of band members 26 and a plurality of spike members 20 secured to each band member, in the manner described above in connection with the embodiment of FIG. 1. Although only one row of spike members is shown on each drum in FIG. 4, there are a plurality of rows of spike members on each drum. The band members are axially adjustable on the drum in the manner described above. Stand members 33 at the corners of the frame are for the purpose of supporting the apparatus when it is not being used.

In order to change the depth of penetration of spike members into the soil, the operator of the tractor can adjust the three-point hitch up or down, as desired.

FIG. 5 illustrates a preferred embodiment of spike member 20 which is useful in the apparatus. The spike member is arc-shaped and tapered and preferably has a length of about 12 inches. The radius of curvature of the spike member is preferably in the range of about 30 inches, although other curvatures could also be used. The outer three inches or so of the free end of the spike member are preferably hardened to increase wear life. The base includes openings 20A for bolting the spike member to the band members.

FIG. 6 shows another embodiment of spike member 40 which is useful in the apparatus. This version is preferably about 12 inches long and is tapered at its outer end, as shown. The base includes openings 40A to facilitate bolting to the band members. This embodiment is not arc-shaped. It is useful when aerating soil which is sandy or very easily penetrated.

Other variants are possible without departing from the scope of this invention.

What is claimed is:

1. Field aerator apparatus comprising:
   (a) a frame;
   (b) at least one cylindrical drum member rotatably carried by said frame for rotation about the longitudinal axis of said drum member; wherein said drum member has a diameter in the range of about 2 to 4 feet;
   (c) attachment means comprising a tongue member connected to said frame for connecting said apparatus to a towing vehicle;
   (d) a plurality of band members carried on the periphery of said drum; wherein said band members are adjustably movable axially along said drum; and
   (e) a plurality of elongated spike members, each having a base end and a tapered free end, wherein said base end is secured to one of said bands, and wherein said free end projects radially outward from said drum member; wherein a plurality of said spike members are detachably secured to each of said band members; and wherein said spike members have a thickness in the range of about 0.5 to 1 inch;
   (f) wheel members attached to said frame; and
   (g) lift means for moving said drum member between raised and lowered positions.

2. Apparatus in accordance with claim 1, wherein a plurality of said spike members are secured to each of said band members, and wherein said spike members are arc-shaped.

3. Apparatus in accordance with claim 1, wherein said spike members have a uniform thickness along their length.

4. Apparatus in accordance with claim 1, wherein said base end of each said spike member is bolted to one of said band members.

5. Apparatus in accordance with claim 1, wherein each said band member includes first and second ends which are detachably connected together.

6. Apparatus in accordance with claim 1, wherein the spike members which are attached to adjacent band members are offset.

7. Apparatus in accordance with claim 1, wherein there are two said cylindrical drum members which are axially aligned.

8. Field aerator apparatus comprising:
   (a) a frame;
   (b) at least one cylindrical drum member rotatably carried by said frame for rotation about the longitudinal axis of said drum member; wherein said drum member has a diameter in the range of about 2 to 4 feet;
   (c) attachment means comprising a tongue member connected to said frame for connecting said apparatus to a towing vehicle;
   (d) a plurality of band members carried on the periphery of said drum; wherein said band members are adjustably movable axially along said drum; wherein each said band member includes first and second ends which are detachably connected together; and
   (e) a plurality of arc-shaped spike members, each having a base end and a tapered free end, wherein said base end is detachably secured to one of said bands, and wherein said free end projects radially outward from said drum member; and wherein said spike members have a thickness in the range of about 0.5 to 1 inch; wherein a plurality of said spike members are secured to each of said band members;
   (f) wheel members attached to said frame; and
   (g) lift means for moving said drum member between raised and lowered positions.

9. Apparatus in accordance with claim 8, wherein said spike members have a uniform thickness along their length.

10. Apparatus in accordance with claim 8, wherein said base end of each said spike member is bolted to one of said band members.

11. Apparatus in accordance with claim 8, wherein the spike members which are attached to adjacent band members are offset.

12. Apparatus in accordance with claim 8, wherein there are two said cylindrical drum members which are axially aligned.

13. Apparatus in accordance with claim 8, wherein said frame is rectangular and includes four corners; and wherein said wheel members are positioned at said corners.

14. Apparatus in accordance with claim 8, wherein said frame includes forward and rearward sides; and wherein said tongue member can be connected to either said forward or said rearward side.

\* \* \* \* \*